(12) United States Patent
Smereka et al.

(10) Patent No.: US 9,775,100 B1
(45) Date of Patent: Sep. 26, 2017

(54) PASSENGER ZONE DETECTION WITH SIGNAL STRENGTH DATA AIDED BY PHYSICAL SIGNAL BARRIERS

(71) Applicant: MYINE ELECTRONICS, INC., Ferndale, MI (US)

(72) Inventors: Scott Smereka, Warren, MI (US); Justin Dickow, Royal Oak, MI (US); Corey Maylone, Berkley, MI (US); John Byrne, Detroit, MI (US)

(73) Assignee: Livio, Inc., Royal Oak, MI (US)

( * ) Notice: Subject to any disclaimer, the term of this patent is extended or adjusted under 35 U.S.C. 154(b) by 0 days.

(21) Appl. No.: 15/077,417

(22) Filed: Mar. 22, 2016

(51) Int. Cl.
| | |
|---|---|
| *H04W 48/00* | (2009.01) |
| *H04W 48/14* | (2009.01) |
| *H04W 8/00* | (2009.01) |
| *H04W 76/02* | (2009.01) |

(52) U.S. Cl.
CPC .......... *H04W 48/14* (2013.01); *H04W 8/005* (2013.01); *H04W 76/023* (2013.01)

(58) Field of Classification Search
CPC ....... H04B 1/082; H04B 1/3822; H04W 4/04; H04W 4/046
USPC .................. 455/41.1, 41.2, 41.3, 96, 99, 345
See application file for complete search history.

(56) References Cited

U.S. PATENT DOCUMENTS

| | | | |
|---|---|---|---|
| 6,396,412 B1 | 5/2002 | Banas | |
| 7,167,714 B2 | 1/2007 | Dressler et al. | |
| 8,082,096 B2 | 12/2011 | Dupray | |
| 8,135,413 B2 | 3/2012 | Dupray | |
| 8,232,863 B2 | 7/2012 | Nakajima et al. | |
| 8,538,408 B2 | 9/2013 | Howarter et al. | |
| 8,634,816 B2 | 1/2014 | Xiao et al. | |
| 8,744,482 B2 | 6/2014 | Margalef et al. | |
| 9,008,917 B2 | 4/2015 | Gautama et al. | |
| 9,332,125 B2 | 5/2016 | Tadayon et al. | |
| 2005/0275511 A1 | 12/2005 | Luo et al. | |
| 2006/0153141 A1 | 7/2006 | Hirano | |
| 2007/0200672 A1 | 8/2007 | McBride et al. | |
| 2010/0075655 A1* | 3/2010 | Howarter ............ | B60R 25/2009 455/420 |
| 2010/0076622 A1 | 3/2010 | Dickerhoof et al. | |
| 2010/0305779 A1 | 12/2010 | Hassan et al. | |
| 2011/0105097 A1* | 5/2011 | Tadayon ............... | H04W 4/025 455/418 |
| 2011/0195699 A1 | 8/2011 | Tadayon et al. | |
| 2012/0208520 A1 | 8/2012 | Howarter et al. | |
| 2012/0220284 A1 | 8/2012 | Tadayon et al. | |

(Continued)

FOREIGN PATENT DOCUMENTS

| | | |
|---|---|---|
| CN | 101669149 B | 12/2012 |
| WO | 2008131813 A1 | 11/2008 |

*Primary Examiner* — Wen Huang
(74) *Attorney, Agent, or Firm* — Jennifer M. Stec; Brooks Kushman P.C.

(57) ABSTRACT

Values may be tracked from wireless sensors of a vehicle that indicate distances between the mobile device and the sensors. When the signal strength values indicate the mobile device is within the vehicle, the device may be associated with a seating zone of the vehicle corresponding to the one of the sensors that provided signal strength values that peaked earliest in time. The mobile device may be determined to be within the vehicle by using a hypothesis test comparing a threshold signal strength value to the signal strength values.

20 Claims, 8 Drawing Sheets

(56) References Cited

U.S. PATENT DOCUMENTS

| | | | | |
|---|---|---|---|---|
| 2012/0244877 A1* | 9/2012 | Margalef | ............. | G01S 5/0252 455/456.1 |
| 2013/0029650 A1* | 1/2013 | Xiao | .................... | H04W 4/027 455/417 |
| 2016/0227020 A1 | 8/2016 | Tadayon et al. | | |
| 2016/0227021 A1 | 8/2016 | Tadayon et al. | | |

* cited by examiner

400

| | Time | Door | Signal Strength | Time | Door | Signal Strength | |
|---|---|---|---|---|---|---|---|
| 402-A | 11:20:17 | 1 | -66 | 11:20:23 | 1 | -63 | 402-G |
| | 11:20:17 | 2 | -67 | 11:20:23 | 2 | -66 | |
| | 11:20:17 | 4 | -67 | 11:20:23 | 4 | -66 | |
| | 11:20:17 | 3 | -71 | 11:20:23 | 3 | -68 | |
| 402-B | 11:20:18 | 1 | -65 | 11:20:24 | 1 | -57 | 402-H |
| | 11:20:18 | 2 | -66 | 11:20:24 | 2 | -61 | |
| | 11:20:18 | 4 | -66 | 11:20:24 | 4 | -62 | |
| | 11:20:18 | 3 | -73 | 11:20:24 | 3 | -66 | |
| 402-C | 11:20:19 | 1 | -65 | 11:20:25 | 1 | -47 | 402-I |
| | 11:20:19 | 2 | -67 | 11:20:25 | 2 | -51 | |
| | 11:20:19 | 4 | -67 | 11:20:25 | 4 | -57 | |
| | 11:20:19 | 3 | -73 | 11:20:25 | 3 | -58 | |
| 402-D | 11:20:20 | 1 | -65 | 11:20:26 | 1 | -48 | 402-J |
| | 11:20:20 | 2 | -67 | 11:20:26 | 2 | -50 | |
| | 11:20:20 | 4 | -67 | 11:20:26 | 4 | -54 | |
| | 11:20:20 | 3 | -72 | 11:20:26 | 3 | -57 | |
| 402-E | 11:20:21 | 1 | -64 | 11:20:27 | 2 | -49 | 402-K |
| | 11:20:21 | 2 | -66 | 11:20:27 | 1 | -50 | |
| | 11:20:21 | 4 | -67 | 11:20:27 | 4 | -52 | |
| | 11:20:21 | 3 | -72 | 11:20:27 | 3 | -52 | |
| 402-F | 11:20:22 | 1 | -64 | | | | |
| | 11:20:22 | 2 | -65 | | | | |
| | 11:20:22 | 4 | -67 | | | | |
| | 11:20:22 | 3 | -71 | | | | |

*FIG. 4*

|         | 1   | 2   | 3   | 4   |
|---------|-----|-----|-----|-----|
| 11:20:17 | -66 | -67 | -71 | -67 |
| 11:20:18 | -65 | -66 | -73 | -66 |
| 11:20:19 | -65 | -67 | -73 | -67 |
| 11:20:20 | -65 | -67 | -72 | -67 |
| 11:20:21 | -64 | -66 | -72 | -67 |
| 11:20:22 | -64 | -65 | -71 | -67 |
| 11:20:23 | -63 | -66 | -68 | -66 |
| 11:20:24 | -57 | -61 | -66 | -62 |
| 11:20:25 | -47 | -51 | -58 | -57 |
| 11:20:26 | -48 | -50 | -57 | -54 |
| 11:20:27 | -50 | -49 | -52 | -52 |

PASSENGER ZONE DETECTION WITH SIGNAL STRENGTH DATA AIDED BY PHYSICAL SIGNAL BARRIERS

TECHNICAL FIELD

Aspects of the disclosure generally relate to passenger zone detection with signal strength aided by physical signal barriers.

BACKGROUND

Sales of mobile devices, such as smartphones and wearables, continue to increase. Thus, more mobile devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of mobile devices into the driving experience.

SUMMARY

In a first illustrative embodiment, a system includes a mobile device having a wireless transceiver and programmed to track, over time, signal strength values from vehicle wireless sensors indicative of distance between the wireless transceiver and the sensors; and when the signal strength values indicate the mobile device is within the vehicle, associate the mobile device with a seating zone of the vehicle corresponding to the one of the sensors that provided signal strength values that peaked earliest in time.

In a second illustrative embodiment, a system includes wireless sensors of a vehicle; and a vehicle processor programmed to track, over time, signal strength values from vehicle wireless sensors indicative of distance between a mobile device and the sensors; and when the signal strength values indicate the mobile device is within the vehicle, associate the mobile device with a seating zone of the vehicle corresponding to the one of the sensors that provided signal strength values that peaked earliest in time.

In a third illustrative embodiment, a method includes associating, by a processor, a mobile device with a vehicle seating zone responsive to signal strength values from wireless vehicle sensors embedded in vehicle doors indicating the mobile device is inside a vehicle, the vehicle seating zone being proximate to the door including the one of the wireless vehicle sensors providing signal strength values peaking earliest in time.

BRIEF DESCRIPTION OF THE DRAWINGS

FIG. 4 illustrates an example table of snapshots of signal strength values corresponding to the movement of the mobile device into the driver seating zone of the vehicle;

DETAILED DESCRIPTION

Figure 1:
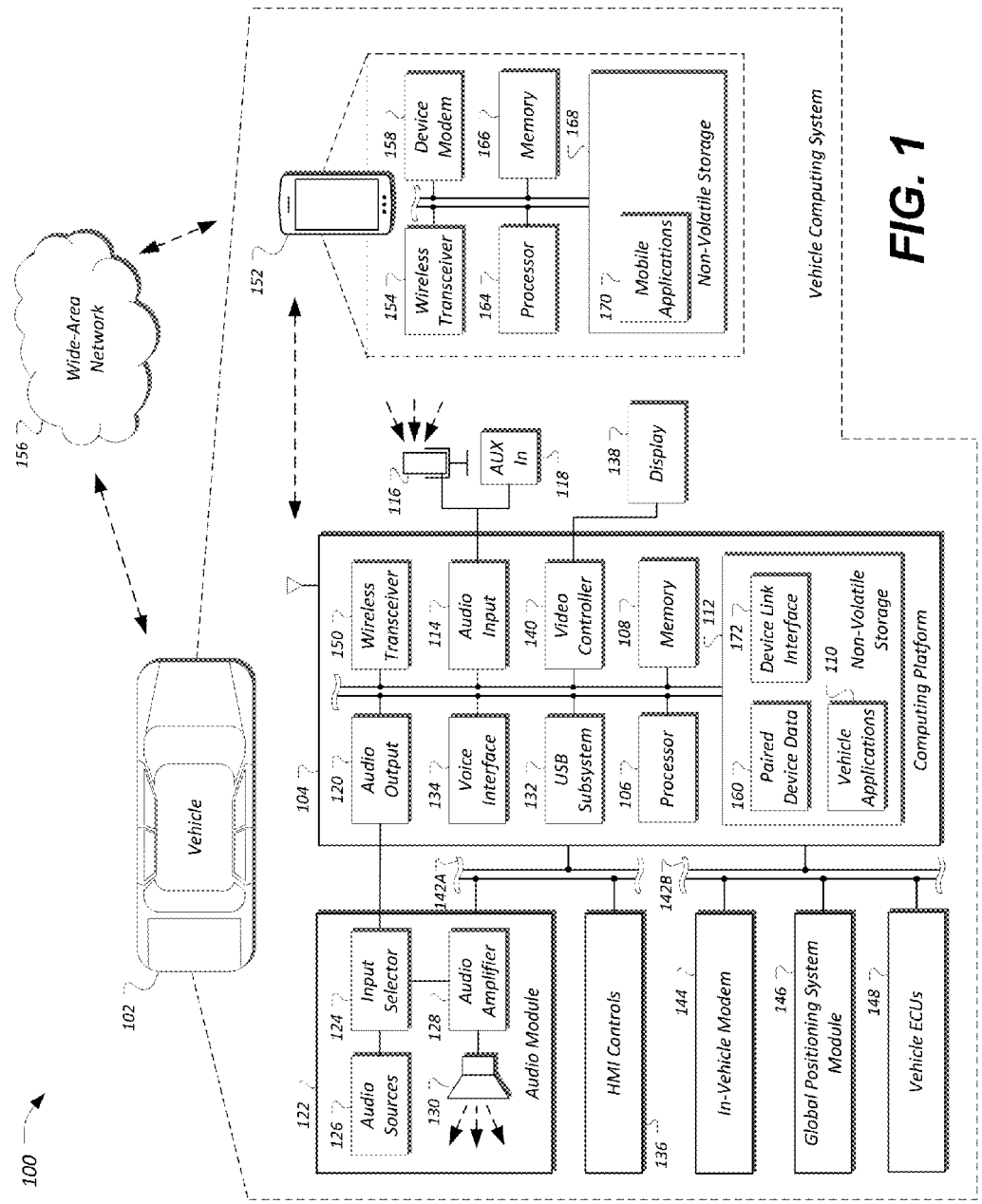
FIG. 1 illustrates an example diagram of a system that may be used to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Certain tasks within a vehicle environment may require knowledge about where a person sits in the vehicle. For example, if a person has an application installed on his or her mobile device to control climate settings, the vehicle or application may attempt to determine the seating zone within the vehicle in which to adjust the settings.

In some solutions, sensors may attempt an instantaneous triangulation of the mobile device within the vehicle to identify the device location. However, a mobile device might be located in a portion of the vehicle that is used for storage, such as the center console to which multiple persons within the vehicle might have access to place their devices. In such a situation, instantaneous triangulation may produce inconclusive results. In general, an ambiguous situation exists along a center line through the vehicle in implementations having sensors on either side of the vehicle.

An improved system for the identification of ownership of mobile devices may be based on the common action of entering or exiting the vehicle, with the premise that a person will be in possession of their mobile device while entering or exiting the vehicle. The system may include wireless sensors placed inside the vehicle on each door, blocked on the outside by the metal of the vehicle door but more exposed on the door interior. The wireless sensors may be configured to provide signal strength or distance information to mobile devices, and may further provide vehicle identifier information and/or information indicative of the location of the sensor within the vehicle. In an example, the wireless sensors may be BLUETOOTH Low Energy (BLE) devices configured to operate as iBeacons.

A model of sensor data from the sensors may be used to determine the passage of the device through one of a predetermined set of identifiable entrances and exits in the vehicle. These entrances and exits may include, for example, the driver's door, the front passenger door, and either of the rear doors in the vehicle. The model may account for properties of the signals emitted by the sensors, which have their signals blocked behind the metal barrier of the vehicle exterior when the door is closed, but that are blocked to a lesser extent when the door is opened. For example, when a user approaches one of the doors and opens it, the mobile device of the user is exposed to the sensor of the opened door, and the received signal strength indication (RSSI) signal for that door spikes. When this occurs, one or more of the signals may no longer be correlated with the rest of the signals. The system may accordingly use this information to determine that the driver entered the vehicle based on this change in correlation. Further aspects of the disclosed approach are discussed in detail below.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e.g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH audio connection. In some examples, the audio input 114 may be configure to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an vehicle modem 144 (which may not be present in some configurations), a global positioning system (GPS) module 146 configured to provide current vehicle 102 location and heading information, and various vehicle ECUs (Electronic Control Units) 148 configured to provide other types of information regarding the systems of the vehicle 102. As some non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142, and the vehicle modem 144, GPS module 146, and vehicle ECUs 148 may communicate with the computing platform 104 over a second in-vehicle network 142. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional or options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

Figure 2:
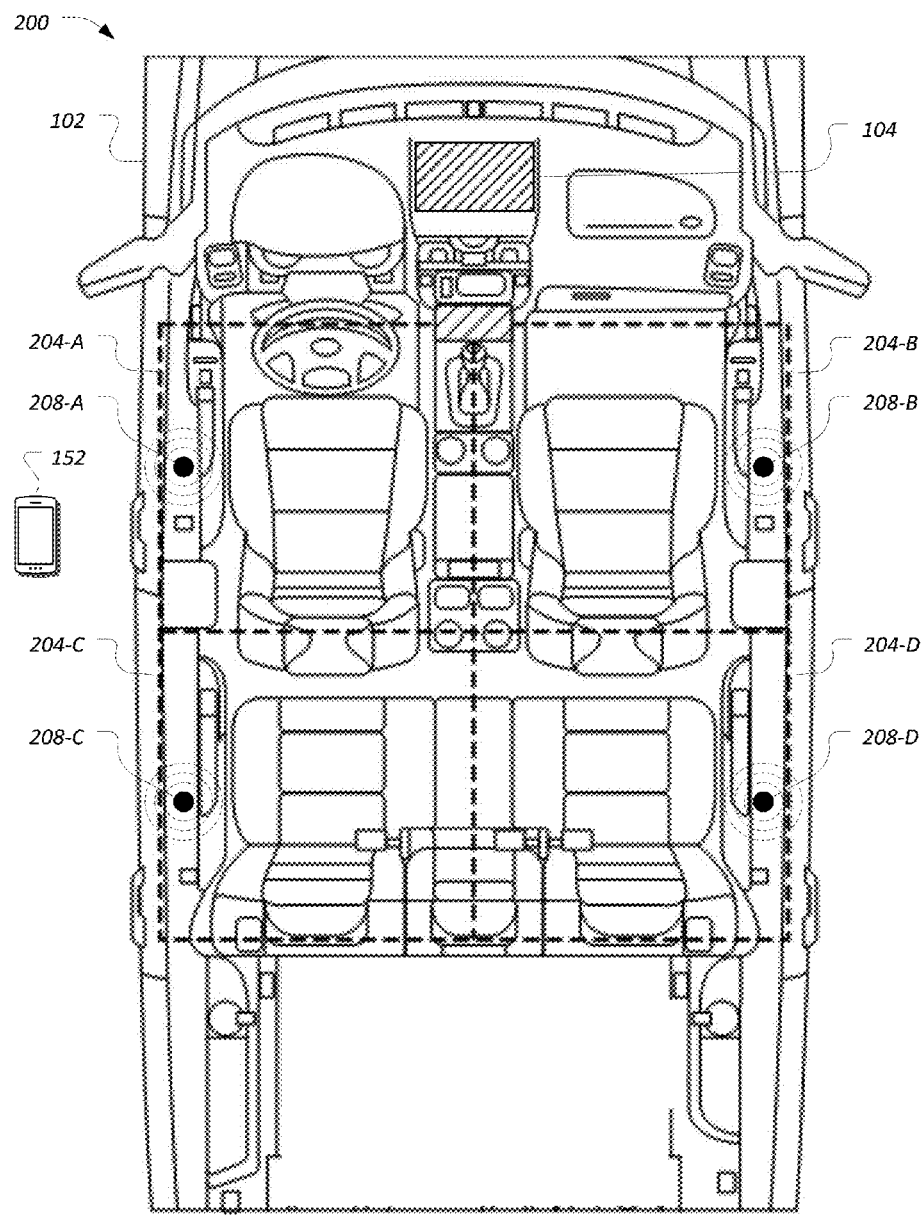
FIG. 2 illustrates an example diagram of the system illustrating the vehicle having an array of wireless sensors for use in assigning mobile devices to seating zones.

FIG. 2 illustrates an example diagram 200 of the system 100 illustrating the vehicle 102 having an array of wireless sensors 208-A through 208-D (collectively 208) for use in assigning mobile devices 152 to seating zones 204-A through 204-D (collectively 204). The assignment of mobile devices 152 to seating zones 204 may be performed by the mobile devices 152 or the computing platform 104 based on data about the signal strength between the mobile devices 152 and the wireless sensors 208. The assignment of mobile devices 152 to seating zones 204 may be used, in an example, to determine which features of the computing platform 104 are applicable to the location of the mobile devices 152. It should be noted that the illustrated system 100 is merely an example, and more, fewer, and/or differently located elements may be used. For examples, different vehicles 102 may include more, fewer, or differently-arranged seating zones 204 and/or wireless sensors 208.

The vehicle 102 interior may be divided into multiple zones 204, where each seating zone 204 may be associated with a seating position within the vehicle 102 interior. For instance, the front row of the illustrated vehicle 102 may include a first zone 204-A associated with the driver seating position, and a second zone 204-B associated with a front passenger seating position. The second row of the illustrated vehicle 102 may include a third zone 204-C associated with a driver-side rear seating position and a fourth zone 204-D associated with a passenger-side rear seating position.

The wireless sensors 208 may include various types of wireless transceivers configured to communicate wirelessly with the mobile devices 152. In an example, the wireless sensors 208 may include one or more of a BLUETOOTH module, a ZIGBEE transceiver, a Wi-Fi transceiver, an IrDA transceiver, an RFID transceiver, etc. configured to communicate with compatible wireless transceivers 154 of the mobile devices 152.

The wireless sensors 208 in the vehicle 102 may support BLE or another wireless technology that can provide distance or signal measurements between the mobile devices 152 and the wireless sensor 208. For instance, the mobile devices 152 may communicate with wireless sensors 208 supporting BLE to capture RSSI information provided by BLE protocol. In such a BLE example, the wireless sensors 208 of the vehicle 102 may advertise as BLE Peripherals, and the mobile device 152 may scan for BLE Peripherals as a BLE Central.

In some examples, the wireless transceiver 150 of the computing platform 104 may allow the computing platform 104 to communicate with the wireless sensors 208. For instance, the computing platform 104 may communicate with the wireless sensors 208 to receive the signal strength information between the wireless sensors 208 and the mobile devices 152. As another possibility, the computing platform 104 may communicate with the wireless sensors 208 over wired connections. For instance, the computing platform 104 may communicate with the wireless sensors 208 over wired universal serial bus (USB) connections connecting the computing platform 104 to the wireless sensors 208.

The wireless sensors 208 may be configured to provide signal strength information to indicate a stronger signal as the mobile device 152 approaches the wireless sensor 208, and a weaker signal as the mobile device 152 departs from the wireless sensor 208. As another possibility, the wireless sensors 208 may be configured to provide distance information indicating a measure of the distance between the wireless sensor 208 and the mobile devices 152 that becomes smaller as the mobile devices 152 approaches the wireless sensor 208, and that becomes greater as the mobile device 152 departs from the wireless sensor 208. As explained in detail below, techniques may then be used to locate the mobile device 152 within the vehicle using the signal strength or distance information of connections between the mobile device 152 and each of the array of wireless sensors 208.

The wireless sensors 208 may be arranged within each of the doors of the vehicle 102. In the illustrated example, the wireless sensor 208-A is included in the front driver-side door, the wireless sensor 208-B is included in a second-row or rear driver-side door, the wireless sensor 208-C is included in the front passenger-side door, and the wireless sensor 208-D is included in a second-row or rear passenger-side door.

As a more specific example, the wireless sensors 208 may be implemented as iBeacons configured to expose a universally unique identifier (UUID) for use in the device location, with the 8 byte major and 8 byte minor values configured to identify the vehicle 102 in which the wireless sensor 208 is located and the location within the vehicle 102. As one possibility, the 8 bytes of the major value plus the first 5 bytes of minor value may be used to provide the vehicle identifier (e.g., all wireless sensors 208 with a given vehicle identifier are in the same vehicle 102). The last 3 bytes of the minor value may be used to indicate where in the vehicle 102 the respective wireless sensor 208 is located. For instance, the wireless sensor 208-A may indicate a location value of '1' to indicate the front driver door, the wireless sensor 208-B may indicate a location value of '2' to indicate the front passenger door, the wireless sensor 208-C may indicate a location value of '3' to indicate the rear driver door, and the wireless sensor 208-D may indicate a location value of '4' to indicate the rear passenger door.

Variations on the number and arrangement of zones 204 are possible. For instance, an alternate second row may include an additional fifth zone 204-E of a second-row middle seating position (not shown). Or, a vehicle 102 having a third row may have an additional fifth zone 204-E behind the third zone 204-C and an additional sixth zone 204-F behind the fourth zone 204-D (not shown). It should be noted that differences in the zones 204 may affect the arrangement of wireless sensors 208. For instance, a vehicle 102 having additional rows of doors may require additional wireless sensors 208 within the additional doors.

Figure 3A:
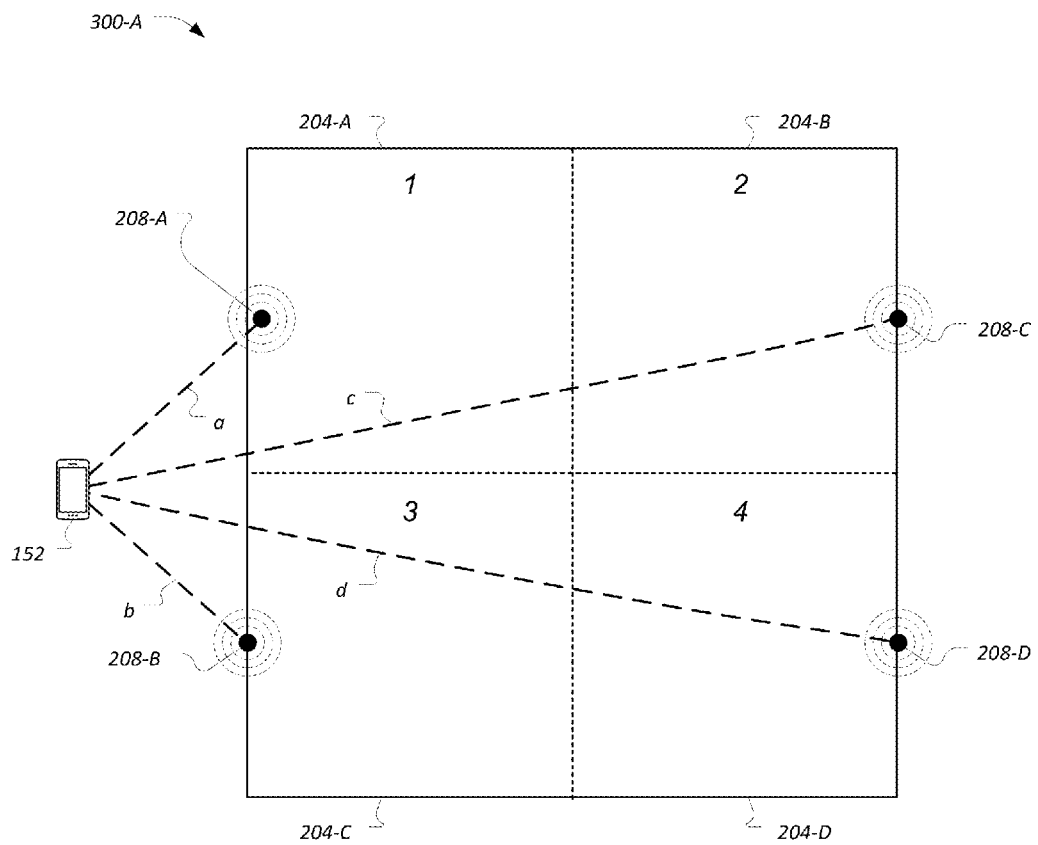
FIGS. 3A-3C illustrate an example diagram of movement of a mobile device into the driver seating zone of the vehicle.
Figure 3B:
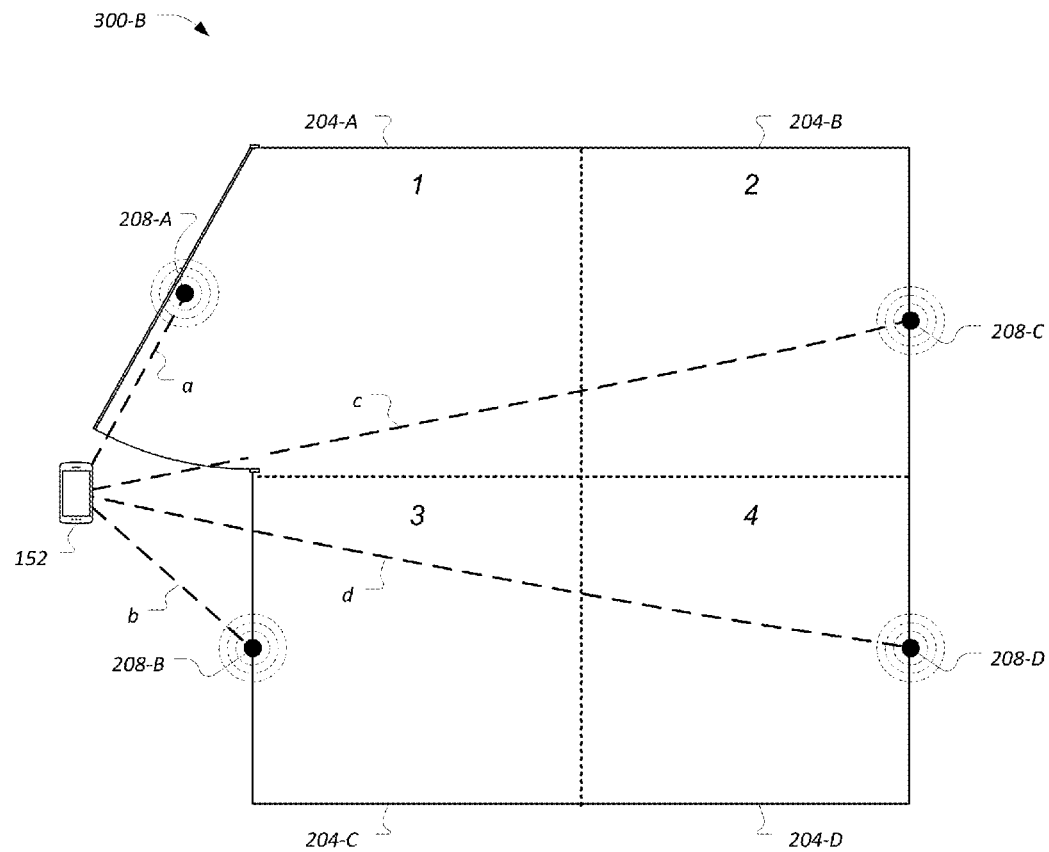
Figure 3C:
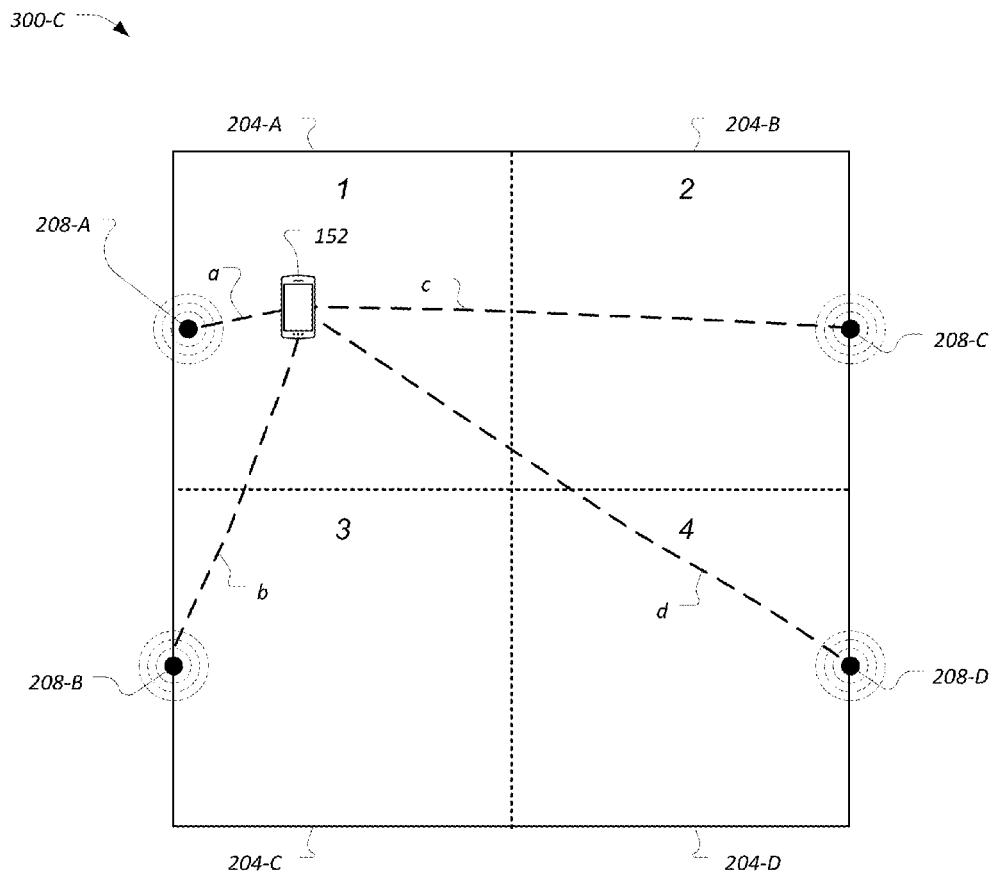

FIGS. 3A-3C illustrate an example 300 of movement of a mobile device 152 into the driver seating zone 204 of the vehicle 102. FIG. 3A illustrates an example 300-A including the mobile device 152 before the mobile device 152 has begun to enter the vehicle 102. FIG. 3B illustrates an example 300-B including the mobile device 152 when the vehicle door 102 has been opened as the mobile device 152 is entering the vehicle 102. FIG. 3C illustrates an example 300-C including the mobile device 152 having entered the vehicle 102. Moreover, each of the examples 300-A through 300-C illustrates a state of the signal strength/distance information collected from the wireless sensors 208 during entry of a user into the vehicle 102.

The distance between each wireless sensor 208 and the mobile device 152 may be tracked. As shown, the distance between the wireless sensor 208-A and the mobile device 152 is indicated as the distance a, the distance between the wireless sensor 208-B and the mobile device 152 is indicated as the distance b, the distance between the wireless sensor 208-C and the mobile device 152 is indicated as the distance c, the distance between the wireless sensor 208-D and the mobile device 152 is indicated as the distance d. It should be noted that many examples herein reference the values a, b, c, and d in terms of signal strength, in which higher values indicate closer proximity. In other examples however, the values a, b, c, and d may be distance values in which lower values indicate closer proximity. In examples in which the values a, b, c, and d relate to distance, the analysis in terms of increasing and decreasing values may be reversed.

In the illustrated examples 300-A through 300-C, the vehicle 102 includes four seating zones 204-A through 204-D. The example 300 also includes four wireless sensors 208-A through 108-D, where each sensor 208 is included within a door to one of the four seating zones 204-A through 104-D. The locations of the wireless sensors 208 may be determined by the mobile device 152 from information broadcast or otherwise provided by the wireless sensors 208 as discussed above.

When the mobile device 152 arrives into range of the wireless sensors 208 of the vehicle 102 (e.g., within range of BLE advertisements of the wireless sensors 208), the mobile device 152 may initiate tracking of the values a, b, c, and d. For instance, the mobile device 152 may maintain information indicative of the values a, b, c, and d over time in a memory of the mobile device 152.

FIG. 4 illustrates an example table 400 of snapshots 402-A through 402-K (collectively 402) of signal strength values corresponding to the movement of the mobile device 152 into the driver seating zone 204-A of the vehicle 102. Each snapshot 402 of RSSI values includes a value captured from each one of the plurality of wireless sensors 208-A, 208-B, 208-C and 208-D. Continuing with the example 300, the snapshots 402 indicate signal strength data from the wireless sensors 208 while a user approaches the vehicle 102 and enters through the driver door while carrying the mobile device 152. The table 400 may be representative, for example, of the RSSI values a, b, c, and d tracked by the mobile device 152 illustrated in the example 300 above.

Figures 5, 6:
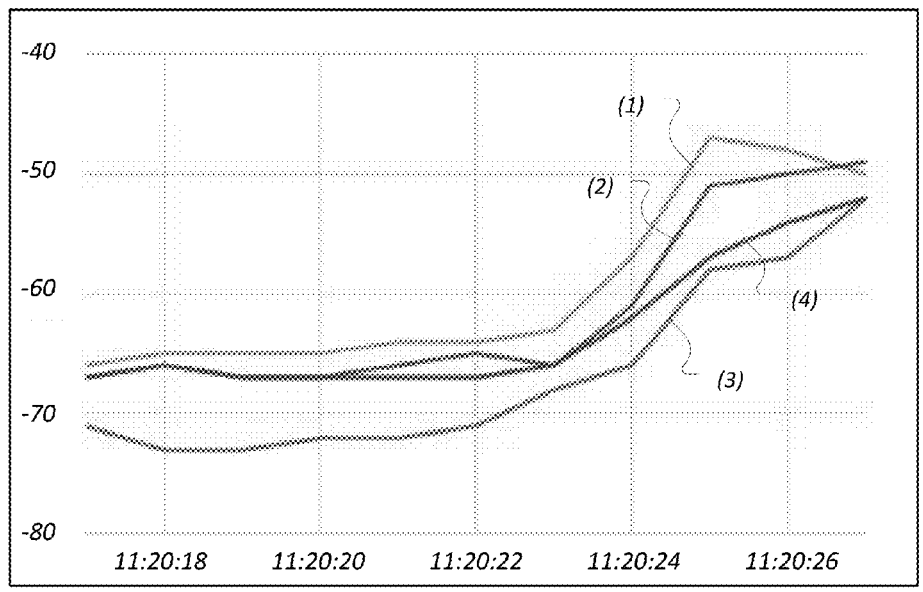
FIG. 5 illustrates the snapshot data of the table organized into an array according to wireless sensor and time.
FIG. 6 illustrates an example graph of the data of the chart over time.

FIG. 5 illustrates the snapshot 402 data of the table 400 organized into an array 500 according to wireless sensor 208 and time. In an example, the mobile device 152 may collect the snapshots 402, and may arrange them according to locations of the wireless sensors 208 to determine values for the individual signal strength a, b, c, and d over time.

FIG. 6 illustrates an example graph 600 of the data of the array 500 over time. In the graph 600, the signal strength information for each of the wireless sensors 208 is plotted over time. For example, the signal strength information a from the wireless sensor 208-A is plotted as line (1), the signal strength information b from the wireless sensor 208-B is plotted as line (2), the signal strength information c from the wireless sensor 208-C is plotted as line (3), and the signal strength information d from the wireless sensor 208-D is plotted as line (4).

As can be seen in the graph 600, the signal strength information of line (1) reaches a signal strength peak first, before that of the other lines (2), (3), and (4). This early peaking may be used to identify that the mobile device 152 passed through the door of the vehicle 102 associated with the line (1). Therefore, the mobile device 152 may be assigned to the seating zone 204-A corresponding to the wireless sensor 208-A providing the data for the line (1).

Figure 7:
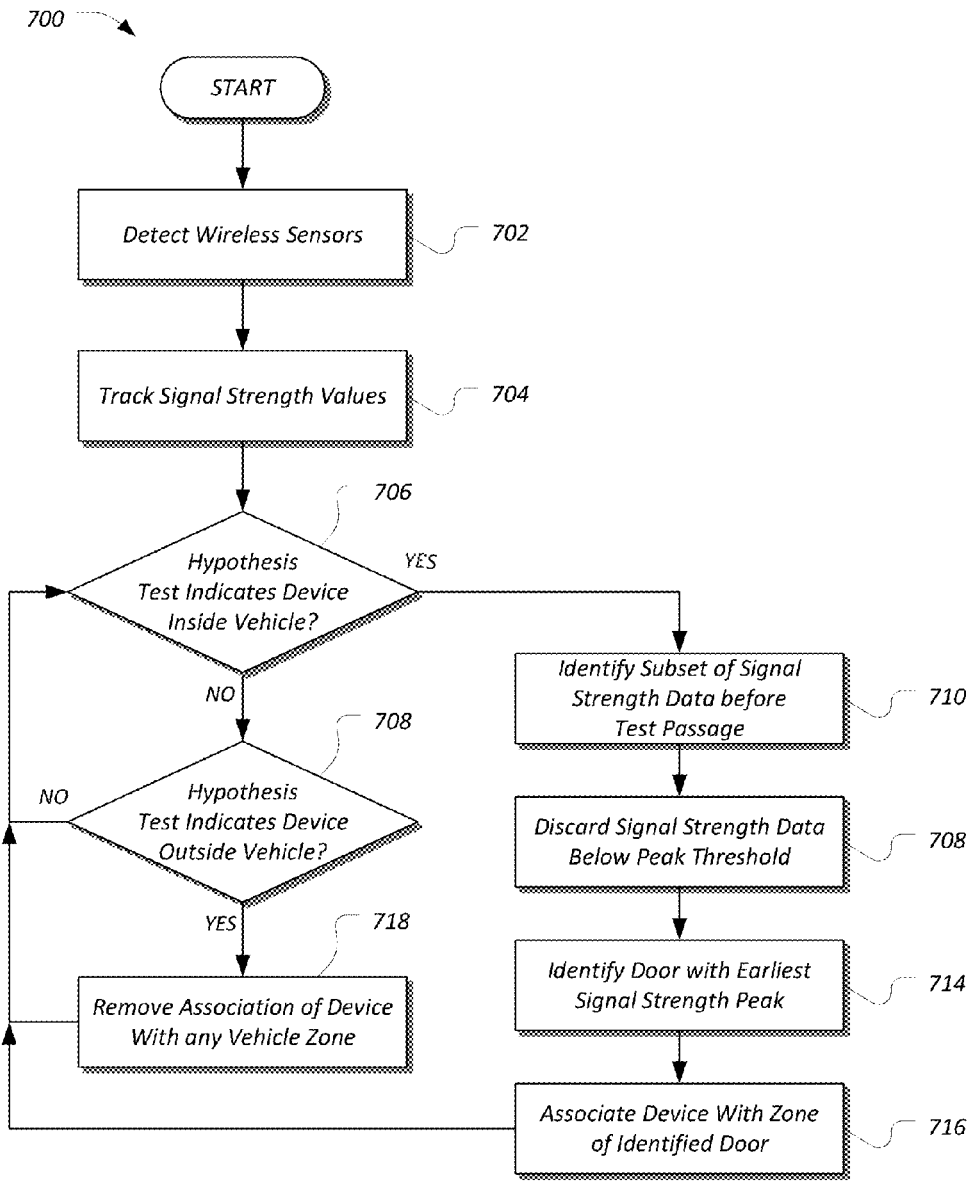
FIG. 7 illustrates an example process for determining the seating zone for the mobile device.

FIG. 7 illustrates an example process 700 for determining the seating zone 204 for the mobile device 152. In an example, the process 700 may be performed by the mobile device 152.

At operation 702, the mobile device 152 detects wireless sensors 208. In an example, the wireless sensors 208 of the vehicle 102 may advertise as BLE Peripherals, and the mobile device 152 may scan for BLE Peripherals as a BLE Central. When wireless sensors 208 are located, the mobile device 152 may extract information from the wireless sensors 208 to identify the locations of the wireless sensors 208 within the vehicle 102. As a more specific example, the wireless sensors 208 may be implemented as iBeacons configured to expose a UUID for use in the device location, with the 8 byte major and 8 byte minor values configured to identify the vehicle 102 in which the wireless sensor 208 is located and the location within the vehicle 102. As one possibility, the 8 bytes of the major value plus the first 5 bytes of minor value may be used to provide the vehicle identifier (e.g., all wireless sensors 208 with a given vehicle identifier are in the same vehicle 102). The last 3 bytes of the minor value may be used to indicate where in the vehicle 102 the respective wireless sensor 208 is located. In other examples, the information relating to the sensor locations and distances may be previously stored to the mobile device 152.

At 704, the mobile device 152 tracks values from the wireless sensors 208. In an example, the mobile device 152 receives distance values from each of the wireless sensors 208 having the identifier of the vehicle 102 and within range of the mobile device 152. Continuing with the example, the mobile device 152 may receive snapshots 402 of distance values a, b, c, and d, from each of the wireless sensors 208-A, 208-B, 208-C, and 208-D, respectively. Table 400 illustrates an example set of snapshots 402 tracked by the mobile device 152.

At operation 706, the mobile device 152 performs hypothesis testing to identify whether the mobile device 152 is inside the vehicle 102. In an example, the mobile device 152 may perform left-tailed hypothesis testing with the received snapshots 402 as compared to a first threshold signal strength value to determine whether the mobile device 152 is considered to be inside the vehicle 102. Merely by way of example, the mobile device 152 may utilize the two most recently received snapshots 402, but more or fewer snapshots 402 may be used to perform the determination. In an example, the first threshold signal strength value may be set to −52 dBm (decibel-milliwatts), although different threshold values may be used. The mobile device 152 further may use a null hypothesis test to confirm whether the snapshot 402 data is greater than or less than a confidence value (e.g., 0.01) to determine whether the snapshot 402 data passed the test. If the mobile device 152 passes the hypothesis test, the mobile device 152 is considered to be within the vehicle 102 and control passes to operation 710. Otherwise, control passes to operation 708.

At 708, the mobile device 152 performs hypothesis testing to identify whether the mobile device 152 is outside the vehicle 102. In an example, the mobile device 152 may perform right-tailed hypothesis testing with the received snapshots 402 as compared to a second threshold signal strength value to determine whether the mobile device 152 is considered to be inside the vehicle 102. Merely by way of example, the mobile device 152 may utilize the two most recently received snapshots 402, but more or fewer snapshots 402 may be used to perform the determination. In an example, the second threshold signal strength value may be set to −56 dBm (decibel-milliwatts), although different threshold values may be used. The mobile device 152 further may use a mean hypothesis test to confirm whether the snapshot 402 data is greater than or less than a confidence value (e.g., 0.01) to determine whether the snapshot 402 data passed the test. It should be noted, however, that the first threshold signal strength value should be set to a value at least as high as that of the second threshold signal strength value. If the mobile device 152 passes this hypothesis test, the mobile device 152 is considered to be outside the vehicle 102 and control passes to operation 718. Otherwise, control passes to operation 706.

At operation 710, the mobile device 152 identifies a subset of signal strength data from the wireless sensors 208 to use to identify a seating zone 204. In an example, the mobile device 152 utilizes the snapshot 420 data to create an array of signal strength over time values for each door. An example array is discussed above with respect to the array 500. In some examples, the mobile device 152 may utilize the snapshot 402 data from each of the snapshots 402 including the snapshot(s) 402 of data passing the hypothesis test. In other examples, the mobile device 152 may utilize the snapshot 402 data up until the data passing the hypothesis test. For instance if the last two snapshots 402 are used to confirm the hypothesis test has passed, then the array of data for further processing may include snapshot 402 data for the most recent snapshots 402, but excluding the most recent two snapshots 402.

In 712, the mobile device 152 discards signal strength data below a peak threshold value. In an example, the mobile device 152 may remove data from the array where the signal strength values fail to meet the threshold value. As one possibility, the threshold value may be set to 50 dBm.

At operation 714, the mobile device 152 identifying the door of the vehicle 102 with the earliest signal strength peak. For example, using the array 500, the mobile device 152 may identify of the wireless sensors 208 produced signal strength data that peaked first (i.e., increased to a maximum value for the sensor 208 and then began to decrease). To use the example of the graph 600, it can be seen that the signal strength data (1) from the wireless sensor 208-A peaked first. It should be noted that the wireless sensor 208 whose data peaked first may not be the same wireless sensor 208 having the highest peak in signal strength data.

At operation 716, the mobile device 152 associates the mobile device with the seating zone 204 of the identified door. Accordingly, the mobile device 152 is associated with the seating zone 204 of the door identified at operation 714. In the example of the graph 600, the mobile device 152 would be associated with the seating zone 204-A corresponding to the wireless sensor 208-A. After operation 716, the process 700 continues to operation 706.

At 718, the mobile device 152 removed the association of the mobile device with any seating zones 204. Accordingly, the mobile device 152 is no longer associated with any seating zones 204 of the vehicle 102. After operation 718, the process 700 continues to operation 706.

Thus, sensor data from wireless sensors 208 included in vehicle 102 doors may be used to determine passage of a mobile device 152 through one of the doors. Based on the determination, the mobile device 152 may be associated with a seating zone 204 corresponding to the door of entry, and may be assumed to be the mobile device 152 of that passenger, regardless of later changes in mobile device 152 location. This information may further be used, for example, to identify or confirm which mobile device 152 is the driver mobile device 152, and which mobile device(s) 152 in the vehicle 102 belong to which passengers.

Computing devices described herein, such as the mobile devices 152 and computing platform 104, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a mobile device having a wireless transceiver and programmed to
track, over time, signal strength values from vehicle wireless sensors indicative of distance between the wireless transceiver and the sensors; and
when the signal strength values indicate the mobile device is within the vehicle, associate the mobile device with a seating zone of the vehicle corresponding to the one of the sensors that provided signal strength values that peaked earliest in time.

2. The system of claim 1, wherein the seating zone is a driver seating zone, and the mobile device is further programmed to identify the mobile device to the vehicle as being located within the driver seating zone.

3. The system of claim 1, wherein the wireless sensors of the vehicle advertise data including an identifier of the vehicle and locations of the wireless sensors within the vehicle, and the mobile device is further programmed to identify the wireless sensors as being associated with the vehicle and the locations of the wireless sensors according to the data.

4. The system of claim 1, wherein the mobile device is further programmed to determine the mobile device is within the vehicle by using a left-tailed hypothesis test comparing a threshold signal strength value to the signal strength values.

5. The system of claim 4, wherein the mobile device is further programmed to:
determine the mobile device is outside the vehicle by using a right-tailed hypothesis test comparing a second threshold signal strength value to the signal strength values, the second threshold signal strength value being of lower signal strength than the threshold signal strength value; and
when the signal strength values indicate the mobile device is outside the vehicle by using the right-tailed hypothesis test, remove association of the mobile device with the seating zone.

6. The system of claim 1, wherein the mobile device is further programmed to discard tracked signal strength values below a predetermined threshold signal strength value to determine the one of the sensors having signal strength values that peaked earliest in time.

7. The system of claim 1, wherein the mobile device is further programmed to utilize a subset of the signal strength values, previous in time to the signal strength values used to indicate that the mobile device is within the vehicle, to determine the one of the sensors that provided signal strength values that peaked earliest in time.

8. The system of claim 1, wherein the values from the wireless sensors include distance measures.

9. A system comprising:
wireless sensors of a vehicle; and
a vehicle processor programmed to
track, over time, signal strength values from the sensors indicative of distance between a mobile device and the sensors; and
responsive to the signal strength values indicating the mobile device is within the vehicle, associate the mobile device with a vehicle seating zone corresponding to the one of the sensors that provided signal strength values that peaked earliest in time.

10. The system of claim 9, wherein the processor is further programmed to identify the mobile device to the vehicle as being located within a driver seating zone when the one of the sensors that provided signal strength values that peaked earliest in time is identified as being located with a door to the driver seating zone.

11. The system of claim 9, wherein the processor is further programmed to determine the mobile device is within the vehicle by using a left-tailed hypothesis test comparing a threshold signal strength value to the signal strength values.

12. The system of claim 11, wherein the processor is further programmed to:
determine the mobile device is outside the vehicle by using a right-tailed hypothesis test comparing a second threshold signal strength value to the signal strength values, the second threshold signal strength value being of lower signal strength than the threshold signal strength value; and
when the signal strength values indicate the mobile device is outside the vehicle by using the right-tailed hypothesis test, remove association of the mobile device with the seating zone.

13. The system of claim 9, wherein the mobile device is further programmed to discard tracked signal strength values below a predetermined threshold signal strength value before determining the one of the sensors having signal strength values that peaked earliest in time.

14. The system of claim 9, wherein the mobile device is further programmed to utilize a subset of the signal strength values, previous in time to the signal strength values used to indicate that the mobile device is within the vehicle, to determine the one of the sensors that provided signal strength values that peaked earliest in time.

15. A method comprising:
associating, by a processor, a mobile device with a vehicle seating zone responsive to signal strength values from wireless vehicle sensors embedded in vehicle doors indicating the mobile device is inside a vehicle, the vehicle seating zone being proximate to a door including one of the wireless vehicle sensors that provides signal strength values peaking earliest in time.

16. The method of claim 15, wherein the door is an entrance to a driver seating zone, and further comprising identifying the mobile device to the vehicle as being located within the driver seating zone.

17. The method of claim 15, wherein the processor is one of: a processor of the vehicle, or a processor of the mobile device.

18. The method of claim 15, further comprising determining the mobile device is within the vehicle by using a first hypothesis test comparing a threshold signal strength value to the signal strength values.

19. The method of claim 18, further comprising:
  determining the mobile device is outside the vehicle by using a second hypothesis test comparing a second threshold signal strength value to the signal strength values, the second threshold signal strength value being of lower signal strength than the threshold signal strength value; and
  when the signal strength values indicate the mobile device is outside the vehicle by using the second hypothesis test, removing association of the mobile device with the seating zone.

20. The method of claim 15, further comprising utilizing a subset of the signal strength values, previous in time to the signal strength values indicating that the mobile device is within the vehicle, for determining the one of the sensors providing signal strength values peaking earliest in time.

* * * * *